(12) United States Patent
Lydick et al.

(10) Patent No.: US 12,380,148 B2
(45) Date of Patent: Aug. 5, 2025

(54) MULTI-TENANT FEED AND INSIGHTS PLATFORM

(71) Applicant: Microsoft Technology Licensing, LLC, Redmond, WA (US)

(72) Inventors: Neil Evan Lydick, Bothell, WA (US); Christopher Andrew Boyd, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/394,605

(22) Filed: Dec. 22, 2023

(65) Prior Publication Data

US 2025/0209105 A1  Jun. 26, 2025

(51) Int. Cl.
*G06F 16/34* (2025.01)
*G06F 16/2457* (2019.01)
*H04L 41/50* (2022.01)
*H04L 41/5022* (2022.01)
*H04L 51/02* (2022.01)

(52) U.S. Cl.
CPC ...... *G06F 16/345* (2019.01); *G06F 16/24578* (2019.01); *H04L 41/5022* (2013.01); *H04L 41/5032* (2013.01); *H04L 51/02* (2013.01)

(58) Field of Classification Search
CPC .. G06F 11/30; G06F 11/3003; G06F 11/3006; G06F 11/302; G06F 11/34; G06F 11/3409; G06F 11/3438; G06F 11/3476; H04L 41/06; H04L 41/069; H04L 41/20; H04L 41/22; H04L 41/50; H04L 41/5032; H04L 41/5061; H04L 41/5064; H04L 41/507; H04L 41/5074; H04L 51/02;
(Continued)

(56) References Cited

U.S. PATENT DOCUMENTS 10,718,632 B1 *  7/2020  Platt ..................... H04L 67/535
11,080,023 B2    8/2021  Bodin et al.
(Continued)

OTHER PUBLICATIONS

Annam, Sri Nikhil. "Enhancing IT support for enterprise-scale applications." International Journal of Enhanced Research in Science, Technology & Engineering 12.3 (2023): 205. (Year: 2023).*
(Continued)

*Primary Examiner* — Vivek Srivastava
*Assistant Examiner* — William C McBeth
(74) *Attorney, Agent, or Firm* — Han Gim; Newport IP, LLC

(57) ABSTRACT

A remote monitoring and management (RMM) system is configured to receive a stream of events generated in response to interactions of users from multiple tenants with one or more applications and store the events in a database. A plurality of different insight types is defined for one or more event types for the events. Insights of the different insight types are generated based on the events in the database, the event types of the events, and numbers of events of the event types. The insights are ranked using an artificial intelligence (AI) model trained to generate a predicted success score for each of the insights. A predetermined number of top insights are selected based on the ranking of the insights and aggregated into a feed. The feed is to at least one computing device associated with the RMM system.

20 Claims, 9 Drawing Sheets

(58) Field of Classification Search
CPC ..... H04L 67/30; H04L 67/306; H04L 67/535; H04L 67/55
See application file for complete search history.

(56) References Cited

U.S. PATENT DOCUMENTS

| | | | |
|---|---|---|---|
| 2019/0095499 A1* | 3/2019 | Payne | G06Q 30/016 |
| 2020/0137097 A1 | 4/2020 | Zimmermann et al. | |
| 2020/0210647 A1 | 7/2020 | Panuganty et al. | |
| 2021/0089977 A1* | 3/2021 | Tabak | G06F 11/3476 |
| 2022/0027826 A1 | 1/2022 | Makhija et al. | |
| 2022/0138697 A1* | 5/2022 | Neckermann | G06N 5/022 |
| | | | 709/204 |
| 2022/0245476 A1* | 8/2022 | Acharya | G06N 5/022 |
| 2023/0237060 A1* | 7/2023 | Patton | G06F 11/3409 |
| 2023/0259558 A1 | 8/2023 | Subramaniam et al. | |
| 2023/0368043 A1* | 11/2023 | Macklin | G06N 5/022 |
| 2024/0184808 A1* | 6/2024 | Prystupa | G06F 16/287 |

OTHER PUBLICATIONS

"Using Oracle Digital Assistant", Retrieved from: https://docs.oracle.com/en/cloud/paas/digital-assistant/use-chatbot/insights1.html#GUID-DA83A784-69CF-45CB-AB1E-0F08D2B2E6CF, Oct. 12, 2023, 33 Pages.

Roimi, Sivanm., "Customer Insights Platform: Why You Need One, and Why Now", Retrieved from: https://staircase.ai/learn/customer-intelligence/customer-insights-platform/, Sep. 20, 2023, 10 Pages.

* cited by examiner

MULTI-TENANT FEED AND INSIGHTS PLATFORM

BACKGROUND

Current remote monitoring management (RMM) systems are inefficient from the perspective of information technology (IT) support staff, especially in cross-tenant scenarios. For example, maintaining multi-tenant environments is a complex undertaking for IT departments to manage, requiring more resources and driving up IT costs. To complete even simple IT tasks for end users, the IT personnel must first figure out which cloud tenant the user is operating in before executing the work or they may have to pull data from multiple tenants. In addition, it can be difficult to summarize activities happening across managed tenants which can make it challenging to prioritize tasks and complete tasks efficiently.

Hence, what is needed are RMM systems that facilitate collaboration and sharing of information among IT support personnel and the integration of cross-tenant data so that the task prioritization and task completion efficiency can be improved.

SUMMARY

In one general aspect, the instant disclosure presents a remote monitoring and management (RMM) system having a processor and a memory in communication with the processor wherein the memory stores executable instructions that, when executed by the processor alone or in combination with other processors, cause the remote monitoring and management (RMM) system to perform multiple functions. The function may receiving a stream of events generated in response to interactions of users with one or more applications, the users being from multiple tenants supported by the RMM system; storing the events in a database of the RMM system; defining a plurality of different insight types, each of the insight types being associated with one or more event types; generating insights of the plurality of different insight types for the multiple tenants based on the events in the database, the event types of the events, and numbers of events of the event types; ranking the insights using an artificial intelligence (AI) model, the AI model being trained to generate a predicted success score for each of the insights and to rank the insights based at least in part on the predicted success score for each of the insights; selecting a predetermined number of top insights based on the ranking of the insights; aggregating the selected predetermined number of top insights into a feed; and delivering the feed to at least one computing device associated with the RMM system.

In yet another general aspect, the instant disclosure presents a method for a remote monitoring and management (RMM) system. The method includes receiving a stream of events generated in response to interactions of users with one or more applications, the users being from multiple tenants supported by the RMM system; storing the events in a database of the RMM system; defining a plurality of different insight types, each of the insight types being associated with one or more event types; generating insights of the plurality of different insight types for the multiple tenants based on the events in the database, the event types of the events, and numbers of events of the event types; ranking the insights using an artificial intelligence (AI) model, the AI model being trained to generate a predicted success score for each of the insights and to rank the insights based at least in part on the predicted success score for each of the insights; selecting a predetermined number of top insights based on the ranking of the insights; aggregating the selected predetermined number of top insights into a feed; and delivering the feed to at least one computing device associated with the RMM system.

In a further general aspect, the instant application describes a non-transitory computer readable medium on which are stored instructions that when executed cause a programmable device to perform functions of receiving a stream of events generated in response to interactions of users with one or more applications, the users being from multiple tenants supported by the RMM system; storing the events in a database of the RMM system; defining a plurality of different insight types, each of the insight types being associated with one or more event types; generating insights of the plurality of different insight types for the multiple tenants based on the events in the database, the event types of the events, and numbers of events of the event types; ranking the insights using an artificial intelligence (AI) model, the AI model being trained to generate a predicted success score for each of the insights and to rank the insights based at least in part on the predicted success score for each of the insights; selecting a predetermined number of top insights based on the ranking of the insights; aggregating the selected predetermined number of top insights into a feed; and delivering the feed to at least one computing device associated with the RMM system. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
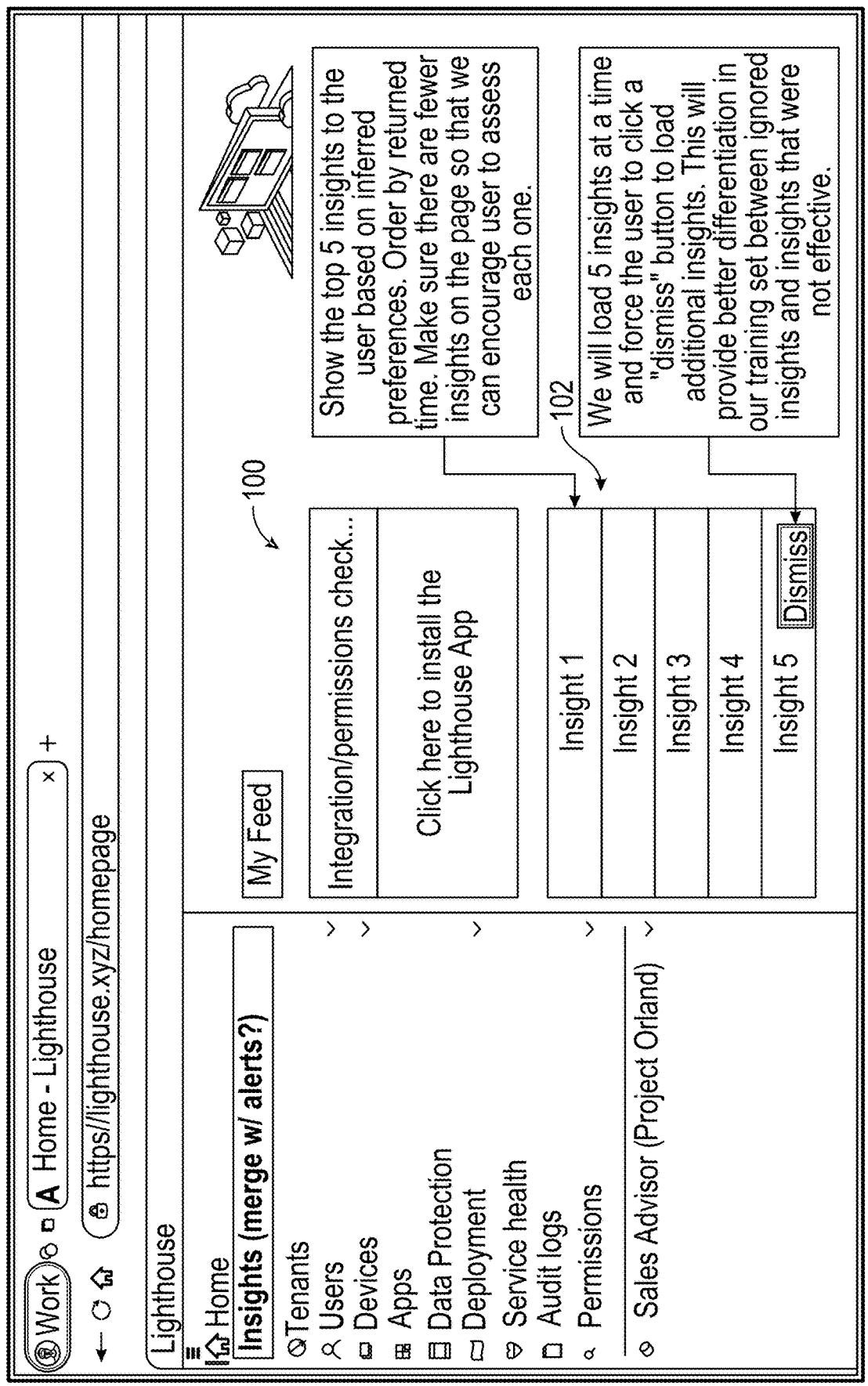
FIGS. 1A-1C show example implementations of a user interface for a multi-tenant feed and insight platform according to this disclosure.

A remote monitoring and management (RMM) system is a type of software used by managed service providers (MSPs) and IT professionals to oversee and control their clients' IT infrastructure, networks, endpoints, and/or devices from a centralized location. It enables monitoring, managing, and maintaining multiple endpoints or systems remotely, regardless of their geographical location. Multi-tenant RMM refers to a specific architecture or design of an RMM system that allows MSPs to serve multiple clients or organizations from a single centralized platform.

Multi-tenant architecture offers several compelling advantages. Firstly, it optimizes resource consumption by sharing infrastructure and software components across tenants, leading to lower operational costs. Secondly, it enables easy scalability, as additional tenants can be added without requiring significant changes to the underlying infrastructure. Thirdly, maintenance and updates become more streamlined, as changes can be applied centrally, benefiting all tenants simultaneously.

However, current remote monitoring management (RMM) systems are inefficient from the perspective of IT support staff, especially in cross-tenant scenarios. For example, maintaining multi-tenant environments is more complex for IT to manage, requiring more resources and driving up IT costs. In an example, to complete even simple IT tasks for end users, they must first figure out which cloud tenant the user is operating in before executing the work or they may have to pull data from multiple tenants. In addition, it can be difficult to summarize activities happening across managed tenants which makes it difficult to prioritize tasks.

To address these technical problems and more, in an example, this description provides technical solutions in the form of an artificial intelligent (AI) driven multi-tenant feed and insights platform for RMM systems that operates cross-tenants and provides actionable insights and feeds to IT support specialist. The platform collects event data across tenants, and generates actionable insight types which are insights defined for the system and are derived from the event data. One example of an insight type that is derivable from event data and that provides actionable insight is the insight that an application that a user uses frequently is crashing. This insight can be derived from event data related to user interactions with the application and event data related to application crashes. The data can be processed to identify occurrences of users having a high frequency of use of an application that has crashed within a given time period. Insights can then be generated based on these occurrences. Insight definitions can also define remedial action to take to address an issue or issues associated with an insight. In this case, the remedial action could be a video conference with a user to discuss the issue.

Event data is collected using a data collection service to collect event data from applications across tenants. A data streaming service, such as an event hub, is then used to stream the event data, and a data explorer service (e.g., Kusto) is used to ingest the data and execute functions based on the insight definitions to extract relevant event data for further processing. Functions for post-processing insights, rendering insights for presentations to users, and aggregating insights into feeds are also defined for each insight type. The data explorer can use these functions to generate insight feeds quickly and efficiently for tenant users and RMM system users. An AI model or machine learning (ML) algorithm is used to process signals based on user interaction with insights and feeds to determine whether modifications to the presentation and/or selection of insights should be made.

In addition to user specific insights and feeds, the system is configured to periodically push partner-relevant insights to a group channel which is accessible to the technicians, administrators, and IT support specialists for the RMM system. In various implementations, a bot application is used to post a limited number of partner-specific insights to the group channel. Insights can be delivered as summaries (i.e., an aggregation of all occurrences of that insight for a given period) or instances (i.e., per occurrence of the insight). In addition, rendering insights for display can include rendering the insights using a predefined schema, such as a parameterized card (e.g., Adaptive Card) template.

Figure 1B:
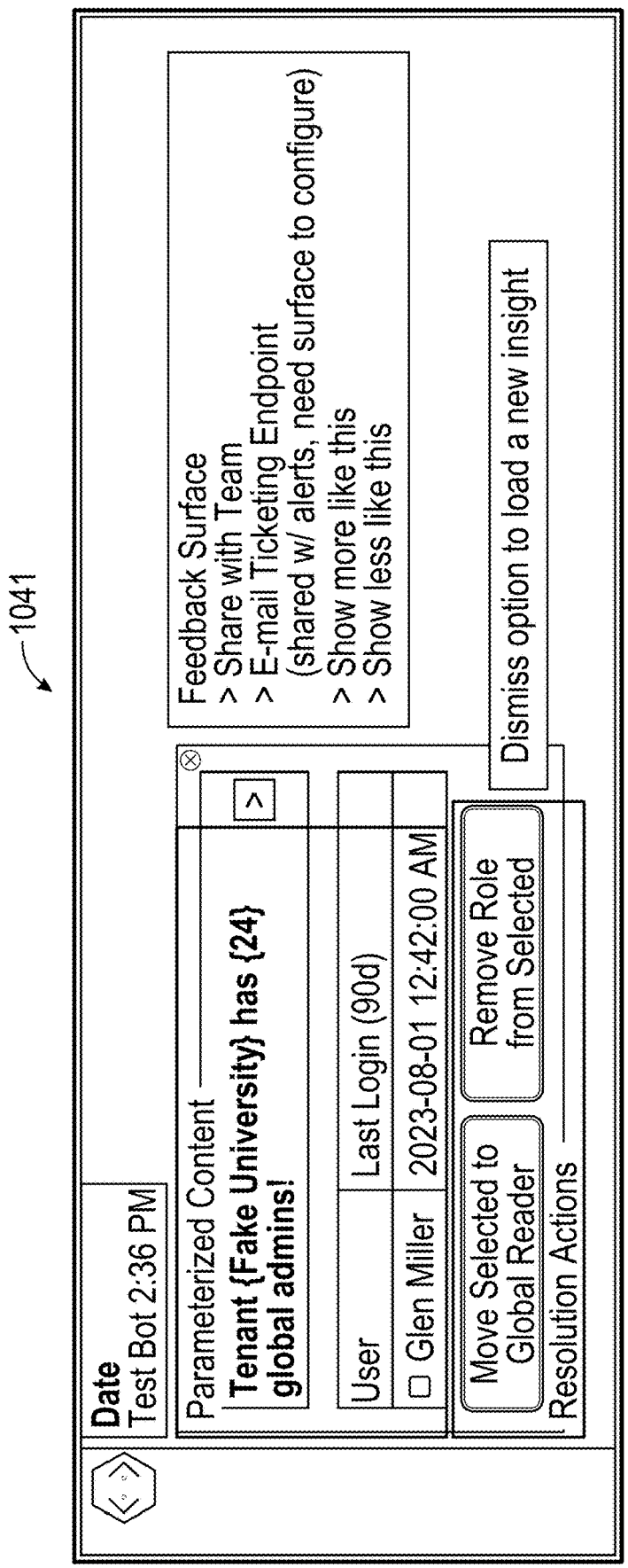

An example implementation of a user interface 100 via which insights are displayed is shown in FIG. 1A. A list of insights 102 for the user is displayed in a card format (e.g., as an Adaptive Card). The list of insights corresponds to the top N insights (e.g., N=5 in this case) selected for the user. A dismiss button is provided on the card to require the user to interact with the insights to enable the system to better differentiate between ignored insights and ineffective insights. Clicking on an insight in the list 102 causes another interface 104 to be shown that includes more detailed information regarding the selected insight, as shown in FIG. 1B. As noted above, data for insights can be delivered in two main forms: (1) a summary or aggregate form that contains statistics about the insight event type (e.g.: counts, affected tenant counts, etc.), and (2) an instance-specific form that contains information about a specific occurrence of an insight event.

The summary insight form may include bulk-remediation options that resolve instances of this problem, possibly requiring a secondary user interface surface to indicate progress and/or the ability to sub-select items to address. Summary forms may also include click-through links to a follow-up page where the user can follow up on specific instances of the problem. The instance insight form may include one or more remediation options that resolve instances of the problem. The instance insight form may also include options for getting more context that derives help from a language model, such as ChatGPT. The instance insight form may also include a link to visit a user interface screen relevant to this issue in an RMM application or in another admin portal. In addition to the above options, some insights contain a feedback control where the user can indicate whether the insight was useful.

Figure 1C:
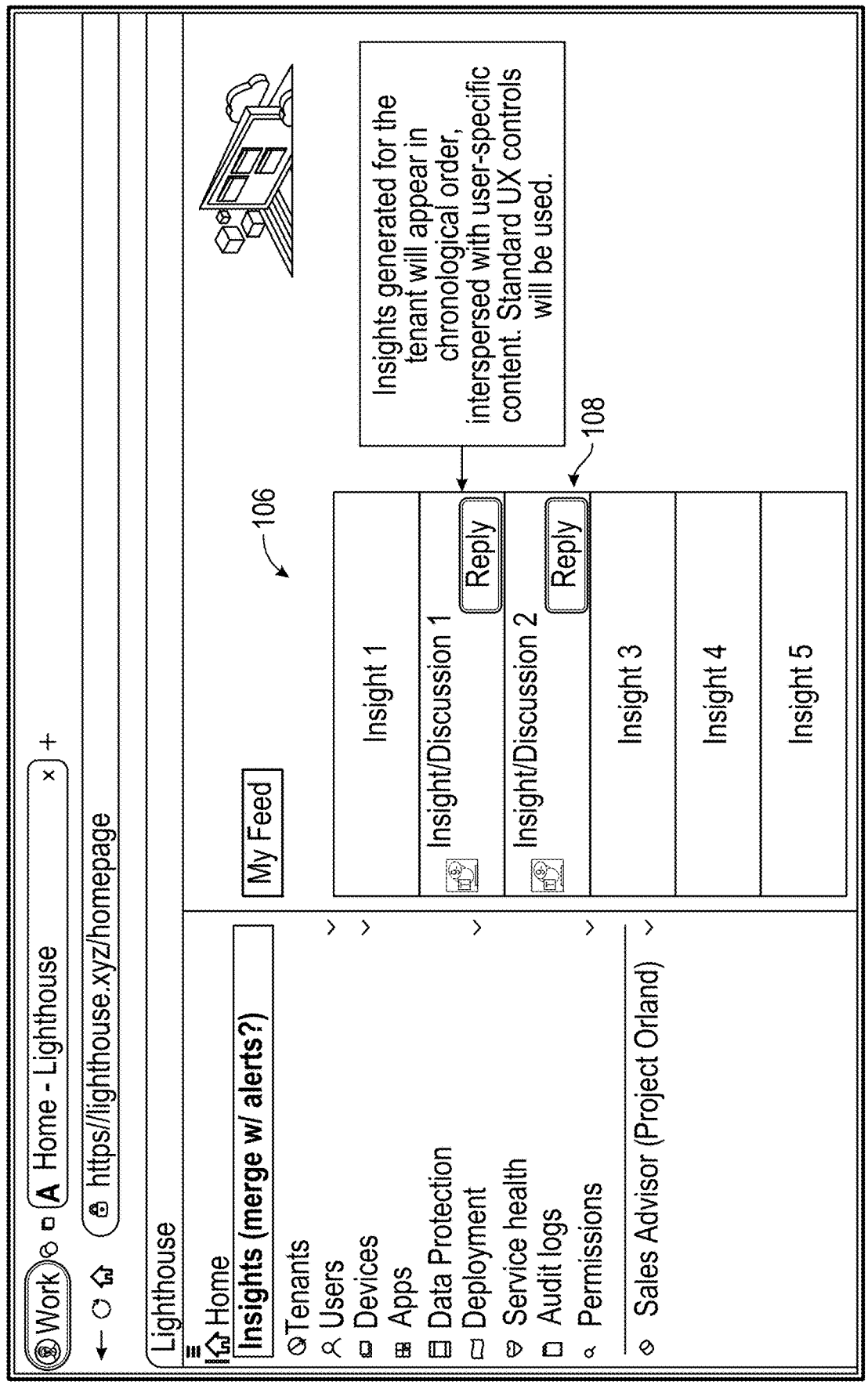

The system may also be configured to periodically push partner-relevant insights to a group channel which is accessible to the technicians, administrators, and IT support specialists for the RMM system. In various implementations, a bot event hub 214 is used to post a limited number of partner-specific insights to the application/bot service front end 216 and the group channel. The partner feed can be used to surface information pertaining to tenant-specific actions performed by each technician, such as "Bob reset Joe's password on application", or "Bob closed more tickets than anyone else today. Congrats!"). This information can be collected from event data and generated in substantially the same manner as insights feeds, e.g., by creating function definitions for the information that is to be collected and surfaced on the partner feed. FIG. 1C shows an insight list 106 that includes partner insights 108 which have been pushed via a Bot. The partner insights will appear in a chronological order and are interspersed with user-specific content. This information can be collected from event data and generated in substantially the same manner as insights feeds, e.g., by creating function definitions for the information that is to be collected and surfaced on the partner feed.

The technical solutions described herein address the technical problem of inefficiencies and difficulties in multi-tenant RRM systems. The technical solutions enable actionable insights to be derived from multi-tenant event data which can be aggregated into feeds that summarize activities across multiple managed tenants, prioritize tasks, and provide guidance on how to address ongoing problems. The solutions facilitate collaboration so that problems are addressed effectively and provide context on activities performed by other IT professionals on the team.

Figure 2:
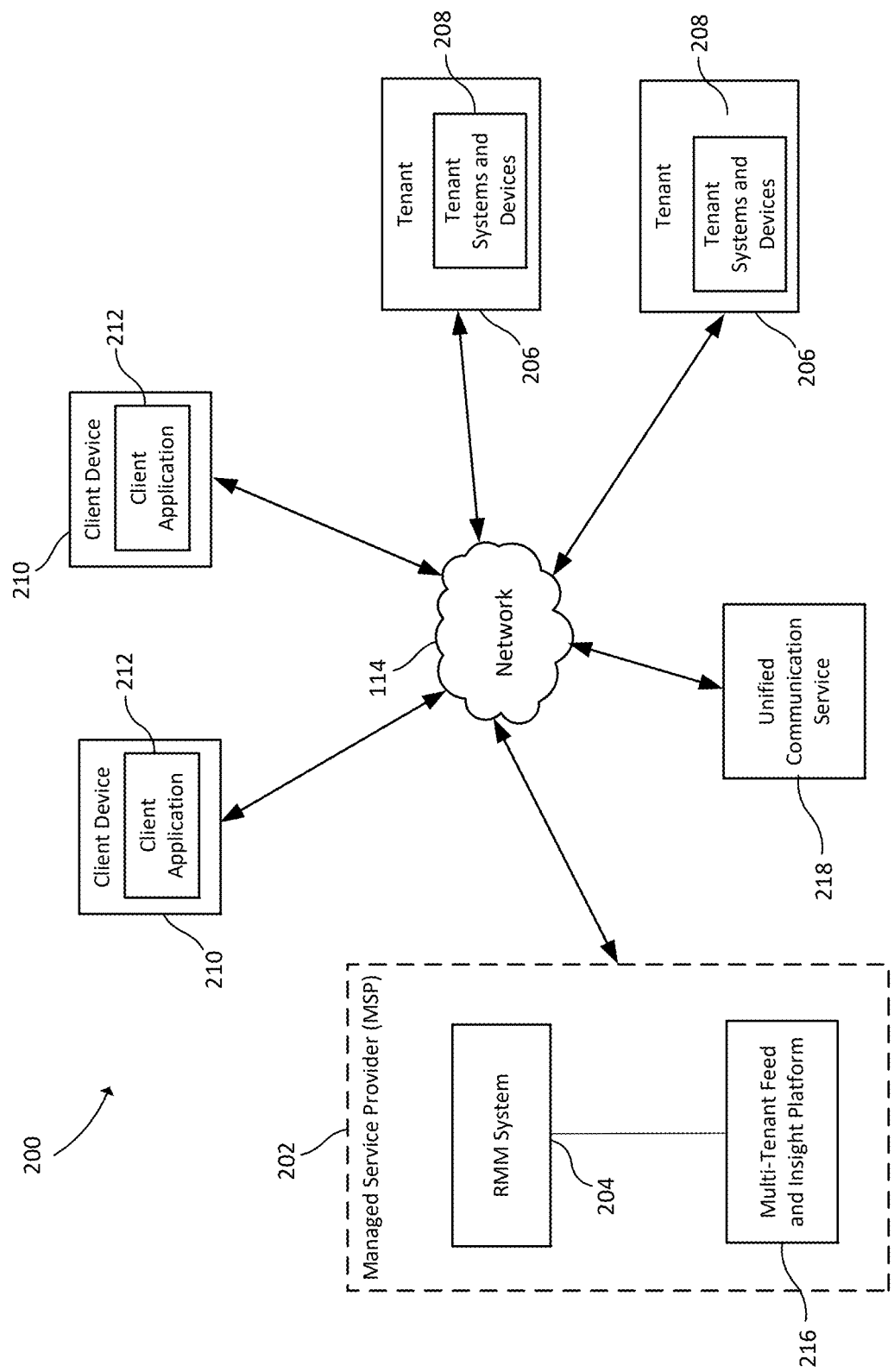
FIG. 2 is a diagram showing an example computing environment in which the techniques disclosed herein may be implemented.

FIG. 2 is a diagram showing an example computing environment 200 in which aspects of the disclosure may be implemented. The computing environment includes a cloud service provider 202. The cloud service provider 202 may be a managed service provider (MSP) which offers one or more managed IT services, such as network monitoring, security, virtualization, disaster recovery, and application and infrastructure management. Managed IT services are performed at least in part by a remote, monitoring, and management (RMM) system 204 is which is used to monitor, analyze, and access customer computers, devices, IT infrastructure, and systems. Cloud service provider 202 supports multi-tenancy meaning that the same RMM system 204 can be utilized to provide managed IT services to multiple tenants, such as tenants 206. As used herein, a "tenant" is a separate and distinct customer or client of the cloud service provider 202. Tenants include various tenant and devices systems 208 which are configured to be accessed and monitored by the RMM system 204. Each tenant typically has a separate service agreement or contract with the cloud service provider 202 which defines the parameters and costs of the service provided to the tenant. Cloud service provider 202 also provides personnel to provide ongoing support and active administration for IT services via the RMM system 204. Multiple personnel may be used to support multiple different tenants. The computing environment also includes a unified communication service 218 that offers a variety of communication and collaboration applications and services which can be accessed by tenants.

The computing environment 200 also includes client devices 210. Client devices 210 enable users, such as IT support specialists, administrators, and service engineers for the cloud service provider to access the RMM system 204 remotely. Client devices 210 can be any suitable type of computing device, such as personal computers, desktop computers, laptop computers, smart phones, tablets, gaming consoles, smart televisions and the like. Client devices 210 include one or more client (software) applications 212 that are configured to interact with the RMM system 204. In some implementations, client application 212 is implemented as a stand-alone application that is installed on the client and which is capable of interacting with the RMM system 204. In other implementations, client application 212 is a general-purpose application, such as a web browser, which can be used to access a web application for interacting with the data collection and reporting service.

Cloud service provider 102, RMM system 204, tenants 206, and client devices 210 are interconnected by a network 214. The network 214 includes one or more communication networks, such as a wide area network (WAN), local area network (LAN), a telecommunication network, a wireless network, a public switched network and/or a satellite network, and may include connections, such as wire, wireless communication links, or fiber optic cables. In general, network 214 can include any combination of connections and protocols capable of supporting communications between tenants 206, cloud service provider 202, and RMM system 204 as well as remote access/control of tenant systems and devices 208 by the RMM system 204.

The RMM system 204 utilizes a multi-tenant feed and insights platform 216 that collects event data generated by user interactions with tenant system and devices 208 and RMM system 204 and processes the event data to derive actionable insights which are aggregated into feeds which summarize issues and events from multiple tenants, prioritize tasks, and provide guidance for remediation of issues.

Figure 3:
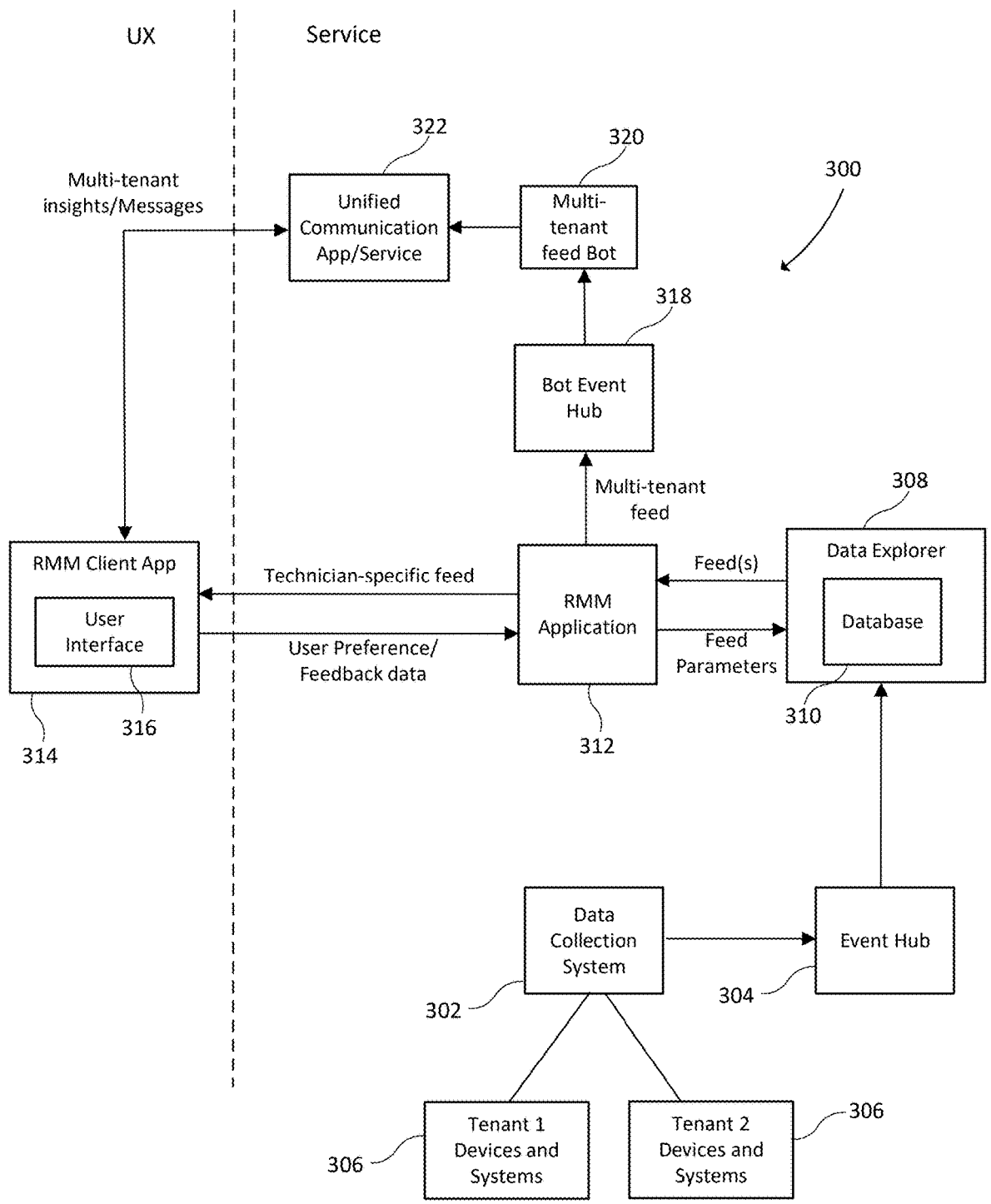
FIG. 3 depicts an example implementation of a multi-tenant feed and insight platform for an RMM system.

An example implementation of a multi-tenant feed and insights platform 300 is shown in FIG. 3. The platform 300 utilizes a data collection system 302 and event hub 304 to collect event data generated by users from multiple tenants 306 (also referred to as tenant users) being monitored and managed by an RMM system. Tenant user interactions can include user logins or login attempts, sending and receiving emails, sending and receiving messages, accessing web pages, opening files, commenting on social media, and the like. Event data includes information pertaining to the user interaction, such as user(s) involved in the interaction, type of interaction, time (or start time and end time) of the interaction, etc. Event data includes a unique identifier that is assigned to the event by the software application or the data collection system.

Event data is transmitted directly to the event hub 304 or to the data collection system 302 which transmits the event data to the event hub 304. Data collection system 302 may be programmed to interact with the software applications via Application Programming Interfaces (APIs) of the applications to define the functions, commands, variables, and the like for causing the applications to generate and send the event data. Data collection component in turn may include an API which defines the functions, commands, variables, and the like for configuring the data collection system 302 and designating parameters for data collection, such as applications from which to collect events, event types to collect, etc.

Event hub 304 ingests event data and streams the event data to a data explorer 208. In various implementations, event hub 304 is a managed, real-time data ingestion service capable of receiving event data from substantially any source and streaming millions of events per second to generate an event data pipeline to the data explorer. Data explorer 308 ingests the event data streamed by the event hub 304 and stores the event data in a data store, such as a database 310. In various implementations, the database 310 is stored in a cluster. A cluster is a storage location implemented by one or more virtual machines. The event data is stored in the database 310 in data structures such as tables which the data explorer 308 can run queries against to extract event data.

The platform 300 includes an RMM application 312 for controlling the generation of insights and feeds for the platform. The RMM application 312 interacts with the data explorer 308 to cause the data explorer 308 to generate technician-specific insights and feeds and multi-tenant insights and feeds. The RMM application 312 provides feed parameters to the data explorer 308, such as type of feed to return, technician/user ID, date range, number of insights per feed, and the like to the data explorer 308 which the data explorer 308 uses to generate insights and aggregate insights into feeds. Data explorer 308 processes events stored in database 310 based on the feed parameters to generate technician-specific feeds (i.e., feeds pertaining to each technician) and multi-tenant feeds (i.e., overall group or team feed) which are returned to the RMM application 312. For each technician-specific feed, the RMM application 312 delivers the feed to an RMM client application associated with the technician for which the feed has been generated. The technician-specific feed is then displayed in a user interface 316 of the RMM client application 314.

Multi-tenant insights/feeds are provided to a bot event hub 318 which is used to deliver the multi-tenant insights/feed to a multi-tenant feed bot 320. A bot comprises software code that runs in background mode in a continuous, automated and unattended fashion on a server. The multi-tenant feed bot 320 is programmed to post multi-tenant insights to a communication channel provided by a unified communication application/service 322 according to a predefined schedule. The bot 320 includes any code, instructions, API functionality, etc. needed to post insights to designated communication channel(s). Each multi-tenant insight includes instructions for rendering the insight which are compatible with the unified communication application/service 322. For example, the unified communication application/service 322 may be capable of rendering Adaptive Cards in a user interface for the application/service 322. In this case, the multi-tenant insights include instructions for rendering the insights in the Adaptive Card format.

The RMM application 312, client application 314, and unified communication app/service 322 are configured to enable communication and collaboration on multi-tenant insights. For example, multi-tenant insights posted to a technician communication channel can be communicated to RMM client application 312 and cross-rendered in the user interface 316 along with technician-specific insights. Messages which are posted to the technician communication channel of the unified communication app/service 322 can also be cross-posted to the user interface of the RMM client application. The RMM client application 314 enables technicians to interact with multi-tenant insights via the user interface 316. Messages generated via the user interface 316 pertaining to multi-tenant insights can be cross-posted to the communication channel of the unified communication app/service 322. In various implementations, cross-posting and cross-rendering of insights and messages is performed via one or more APIs for the RMM system and/or the unified communication app/service.

Data explorer 308 uses stored functions and queries for extracting events, post-processing extracted events, and generating feeds from the extracted events. Each stored function is a named entity which is stored in the database and can be referenced by name in queries and functions. The function for extracting events (e.g., Insight Type entity) uses parameters to define which events to extract from the database. The function or query for each insight type may use different parameters to define which events to extract. In various implementations, the parameters for each insight type include function definition parameters and metadata parameters. The function definition parameters define the boundaries of where to look for the events to extract and include, for example, the user ID, tenant ID, start time, and end time. The metadata parameters define, for example, the type(s) of events associated with the insight type, the priority of the insight, and the unique string ID associated with the insight type. The parameters associated with each insight type may be stored and managed as database schema entities, similar to tables.

An insight type variant function is defined for post-processing the results of an insight type query (e.g., Insight Type Variant entity). The insight type variant function may be stored in memory in, for example, the API service. The insight type variant function includes parameters, such as an insight type variant ID string which uniquely identifies the rendition of the insight, an insight type ID string which indicates the function used to extract the events for the insight, a post-processing query string (e.g., an ODataquery string) query string) which includes post-processing instructions (e.g., aggregation or filtering), a format description (e.g., format enum) which specifies the display strategy for the rendition of the insight (e.g., {Instance=0, Summary=1} for summarization), and display format for the insight. For example, the display format can include a parameterized Adaptive Card JSON (JavaScript Object Notation) template to be rendered over the post-processed data. In this case, the parameters can include (i) localized string parameters for the card UX and (ii) data bindings in the card to insight data rows. The text string to include with an insight type can be predetermined. In some implementations, text strings can be generated as needed using AI, such as a Large Language Model (LLM) (e.g., ChatGPT). An LLM can be trained to generate natural language text descriptions of insights which can be generated as needed, such as at compile time or render time. In this way, insight text descriptions can be varied from time to time which can make the insights more conversational and possibly more engaging for users. The same is true for the UI representations used for the insights. Variations in the display of insights can prevent staleness and promote engagement with insights.

An Insights function is defined which maps to an individual row returned from the function representing the insight type. The base insight is an extensible open entity type that contains, e.g., (1) a Start Date, (2) an End Date (which is the same as the Start Date for insight type), (3) an ID, and (4) a Tenant ID (which is null if the insight is summarized).

A Feed function is defined for aggregating insights into a feed. The feed function is an in-memory function and includes all of the data needed to render the next N insights to the user (or partner tenant) given an open-ended time range. A feed entity includes an ordered list of N complex types (i.e., a predefined entity type) containing: (a) the insight type being displayed, (b) the insight type variant to be rendered, and (c) the insight data to be rendered (as post-processed by the OData query within the insight type variant).

Implicit/explicit parameters for the feed function include: (1) the user issuing the query (null if the partner), (2) the number of feed items to generate, (3) the timer range over which to generate the feed, including at least one endpoint (by default {start=?, end+UtcNow( )}), and (4) the calculated feature values (explained in more detail below) as applicable to the user or partner for which the feed is being requested. When called, the feed function implements a number of algorithms for generating the feed. For example, the feed function can check to see if a feed has already been generated for the user. Once a feed is generated, it can be cached for reuse for a predetermined period of time, e.g., 30 days. The feed function can check to see if a feed has already been generated and cached for the user. If there is, the feed function retrieves the cached feed. The parameters listed above for the feed function are then adjusted based on the cached feed.

The feed function also calls a function feedRank( ) to generate the insight type, insight format, time-interval, and model parameters based on the given API query and user preferences. For each tuple returned by feedRank( ), the feed function is configured to select an insight variant at random corresponding to the insight type and insight format returned, and to issue the required OData queries (with variant-defined aggregation in the case of summary insights) in parallel over the indicated time intervals. In addition, insight variants with Format=summary may also specify a longer query window over which to aggregate data (e.g.: end( )–1d). The resulting feed is then cached and then returned to the computing device of the user requesting the feed for rendering.

Figure 4:
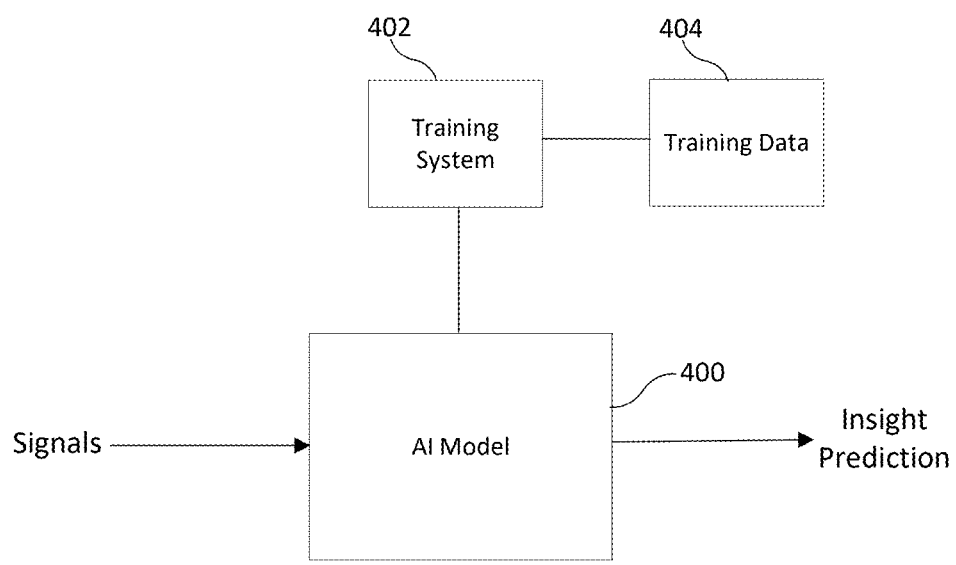
FIG. 4 shows an example implementation of an AI model for the multi-tenant feed and insight platform of FIG. 3.

The feedRank( ) function utilizes an AI model or ML algorithm to select the top N insights to include in the feed. Referring to FIG. 4, an example implementation of an AI model 400 for ranking and recommending insights and changes to feeds is shown. The AI model 400 utilizes a number of signals based on user interactions with the insights and feeds to identify positive and negative engagement with generated insights. In particular, the AI model uses tenant data, technician-specific work data, and technician-specific feedback data. Tenant data and technician-specific work data. Examples of these variables include:
1. The priority that the is ascribed to the insight a priori on a scale of 0-1
2. Number of tenant tags in which the subject tenant participates.
3. Number of users in the subject tenant.
4. Number of Granular Delegated Admin Permission (GDAP) actions performed on this subject tenant by the user in last N days.
5. Number of GDAP actions user has performed on related workload(s) in the last N days.
6. Number of times user has positively engaged with insights on the subject tenant in the last N days.
7. Number of times user has positively engaged with past insights of this type in the last N days.
8. Number of times user has positively engaged with past insights related to this workload (but not of the same type) in the last N days.

Note that tenant-specific variable values will not be present for summary insights and that all metrics may be made available within data explorer for calculation.

The term "positively engaged," as referenced above, refers to any instance of the following actions:
1. User clicked the "show more like this" action.
2. User clicked the "share with Team" action.
3. User clicked "e-mail ticketing Endpoint" action.
4. User clicked on a remediation or information activity on the Action Card "Negatively engaged" is defined as follows:
1. User clicked the "show less like this" action.
2. User clicked the "dismiss" action to load a new insight within 5 s of rendering.
3. User removed the given insight type from their feed preferences.

Based on these factors, positive and negative feedback on generated insights is inferred. In various implementations, the AI model is a supervised learning algorithm that is trained to infer the relationship between the variables identified above and the projected success/failure of user engagement with an insight. In particular, a support vector machine (SVM) binary classification algorithm with a radial base function (RBF) kernel may be used to infer even a nonlinear relationship between input feature vector and data class (success/fail). Since feature vectors will differ slightly between summary insights and instance insights (because summary insights do not have tenant-specific features), training needs to occur independently for each of these insight formats.

A training system 402 trains the AI 400 using training data 404 to process pull requests (and associated test data) to generate outputs as described above. In various embodiments, the training system 402 provides initial and ongoing training to the AI 400 to maintain and/or adjust performance. The training data 404 includes pull requests having desired characteristics, such as a last iteration (or any iteration) that does not involve a pull request change. Training data 404 may also include pull request data and test data for pull requests that have a last iteration (or any iteration) having a policy failure that has been retried and been successful.

For initial training, insights are picked at random for the first N days after the feed is activated for users. For each insight impression, the feature values associated with the insight are recorded. Keeping N<=30 days will help eliminate the need to anonymize the data set at the risk of not receiving sufficient training data in that time interval.

Once a training set is obtained, the SVM training model is manually run in scikit (a Python based machine learning library extension to Kusto) at k different values for {gamma, C}, thereby establishing k different experimental models to use in the following time period. The k support vector sets calculated manually (using pickle) will be serialized and then applied within the feed function (with the Python extension) to predict insight success/failure over the next 30-day window. The goal is to evaluate which of the k models yields the best result and whether performance improves relative to a random control. The process repeats at 30-day intervals until a satisfactory success rate is achieved. Success, here, is measured by user engagement events per impression served (aggregating positives as +1 and negatives as –1). If initial results look promising, the training can be automated with scripts.

Additional experiments can be run to parameterize the following aspects of the algorithm such as follows:
1. Whether to prefer a summary vs instance insight (assuming both types are defined for the insight)
2. The optimal duration over which to render a summary insight
3. The optimal tenant set over which to render a summary insight (e.g.: all vs tag)
4. The optimal variant to display to the end-user for a given insight type
5. The optimal randomness to be injected into feed entries to pique user interest In some implementations, since impression data will arrive relatively slowly from the userbase, initial experimentation will be limited and directed toward predicting engagement by insight type (as discussed above) and prescribe the following constant probabilities to the algorithm:
1. After an insight type has been selected for by feed Rank( ) (see below), where both instance and summary variants of an insight exist, instance insights will be delivered with 80% probability.

2. At the API layer, insight variants will be chosen with uniform probability for the selected insight format.
3. For summary format insights, durations will be chosen uniformly from the set {end-6 h, end-12h, end-1d, end-5 d} unless otherwise specified.
4. Summary insights will be run over all tenants to which the tenant has GDAP access.
5. Except for those insight types excluded by user preference settings, insights will be chosen at random with 100% probability while the initial model is under development and with 20% probability thereafter.
   a. In the 80% probability case where SVM model calculations are used:
      i. We will randomly select 1 of k different experimental parameter sets for our SVM/RBF model (i.e.: C and gamma) to generate the data needed to compare models.
      ii. Any insights positively selected by the SVM model will be prioritized.
      iii. Where no qualifying insights are found with our model, random selection of an insight will occur.

Note that relevance for the partner-specific feed will be produced by supplying feature metrics aggregated from all partner tenant users. In this case, the probability of delivering a summary insight may be increased from 20% to 80% in the partner case. In some cases, certain insight types may be included in all cases (e.g. partner social feed), either by explicit user preference or as a product rule.

Per the above guidelines, the feedRank( ) can be written in KQL pseudocode as follows:

Two types of data points can be used for the measurement of the success:
1. Impressions (i.e., the individual renderings of an insight at a given point in time) in a given context (e.g., application), and for a given user; and
2. Engagement, which can be subdivided into the specific signals listed above.

Each insight displayed within the feed independently records views with the following data:
1. ImpressionId (a guide associated with this impression)
2. UserId to which the insight impression was served (null if sent via bot to the Teams feed)
3. FeedMode (partner or user)
4. InsightType id
5. InsightVariant id (implicitly identifies format, oDataQuery)
6. Tenant (null if summary insight)
7. Duration (null if instance insight)
8. Position (location of the item within the feed 1-5 or potentially higher if Teams integration is enabled)
9. SelectedModelParams (i.e.: C, gamma)
10. Vector (feature vector associated with the returned impressions)
11. Time Each engagement (or human interaction) with an impression records the following data points:
1. ImpressionId
2. EventType ({Dismiss=0, ShowLess=1, ShowMore=2, ShareWithTeam=3, ShareWithEmail=4, VariantCustomAction=5})
3. CustomActionId (an action specific to the insight variant shown)
4. Time

```
let feedRank =
(
    T:(insightTypeId:string,       supportsSummary:bool, workloads:dynamic) ,
    customerids: string,           // gdap-constrained customers access (or ALL if partner)
    partnerid: string,
    userid: string,                // null if partner feed
    start: datetime,
    end: datetime,
    numItems: int
)
{
// 0. set end to now( ) if null
// 1. set start to (now( )-1d) if null
// 2. if (end-start) > 3h then divide (end - start) into N even intervals else set every interval to (end - start)
//
//      (as set logic....)
//
// 3.   For each time interval...
// 4.     For each insight type...
// 5.       Compute SVM input with distinct tenantIds and T/userId,
            randomly select experiment and model params
// 6.       Score each insight row via SVM, extend
            IsPredictedSuccess=1/0=SVM.fit ([..input])
// 7.       collect in ScoredInsightTable
//
// 8.   ScoredInsightTable | summarize take_any(*) |
        where IsPredictedSuccess=1 | group by interval
// 9.   For any empty intervals union with any randomly
        selected insight if one is available
// 10.  For any still random intervals, union with any other insight if available.
// 11.  return (insightTypeId, time-interval, format=rand (80%)->instance/100% if
        supports Summary=false, model params)
};
```

Examples of instance insights that might be implemented by the system are included in the tables below.

App

| Instance Insight | Data Source (* = new) | Action | Summary Insight Variants | User Feed Priority | Partner Feed Priority |
|---|---|---|---|---|---|
| An <application> that <user> uses frequently is crashing | Event Log Endpoint Analytics | Generic ChatGPT Advice Suggest QuickAssist session | — | Low | Low |
| <application> is crashing | Event Log Endpoint Analytics | Update? | — | Med | Low |
| <user> is having trouble logging in | */auditLogs/signIns | Call and reset password? | Count | Hi | Low |
| <tenant> usage of office has fallen precipitously over last 30/60 d | *Ravali/Tim | | Count | Low | Hi |
| <user> mailbox almost full/is full | */reports/getMailboxUsageDetail | Clean Archive Folder Clean Deleted Items Clean Sent Items Enable Archive Mailbox Enable Auto-Expanding Archive | Count Distinct <user> | Hi | Hi |

Security

| Instance Insight | Data Source (* = new) | Action | Summary Insight Variants | User Feed Priority | Partner Feed Priority |
|---|---|---|---|---|---|
| Partner <user> did <administrative thing> on <tenant> | *MSGraphLog *DirectoryAuditLog *UnifiedAuditLog | View | Distinct <thing> Distinct <user> Max <thing> | Hi | Hi |
| Partner <user> commented on <alert> {comment} | /api/managedTenantAlert | View | — | Med | Low |
| Managed tenant <user> did <administrative thing> | *MSGraphLog *Directory AuditLog *UnifiedAuditLog | View | — | Hi | Low |
| Partner <user> worked on <tenant> from <start time> to <end time> | *MSGraphLog *DirectoryAuditLog *UnifiedAuditLog | View | Distinct <tenant> DCount <tenant> | Low | Low |
| Partner did <administrative thing> on <tenant> | *MSGraphLog *DirectoryAuditLog *UnifiedAuditLog | View | Distinct <thing> Distinct <tenant> | Low | Hi |

Social

| Instance Insight | Data Source (* = new) | Action | Summary Insight Variants | User Feed Priority | Partner Feed Priority |
|---|---|---|---|---|---|
| Partner <user> did <administrative thing> on <tenant> | *MSGraphLog *DirectoryAuditLog *UnifiedAuditLog | View | Distinct <thing> Distinct <user> Max <thing> | Hi | Hi |
| Partner <user> | /api/managedTenantAlert | View | — | Med | Low |

-continued

| | | Social | | | |
|---|---|---|---|---|---|
| Instance Insight | Data Source (* = new) | Action | Summary Insight Variants | User Feed Priority | Partner Feed Priority |
| commented on <alert> {comment} Managed tenant <user> did <administrative thing> | *MSGraphLog *DirectoryAuditLog *UnifiedAuditLog | View | — | Hi | Low |
| Partner <user> worked on <tenant> from <start time> to <end time> | *MSGraphLog *DirectoryAuditLog *UnifiedAuditLog | View | Distinct <tenant> DCount <tenant> | Low | Low |
| Partner did <administrative thing> on <tenant> | *MSGraphLog *DirectoryAuditLog *UnifiedAuditLog | View | Distinct <thing> Distinct <tenant> | Low | Hi |

| | | Security | | | |
|---|---|---|---|---|---|
| Instance Insight | Data Source (* = new) | Action | Summary Insight Variants | User Feed Priority | Partner Feed Priority |
| DA/GDAP <expiring soon/has lapsed> for <tenant> | ? | Open GDAP UX Extend | Distinct <tenant> DCount <tenant> | Hi | Hi |
| Managed <tenant> has too many <Global Admin/Admin Roles> | Baselines/MFA for Admins | Remove role Move to reader Initiate chat | — | Hi | Med |
| Partner <user> can operate with <reduced role set> instead of <current role set> | *MSGraphLog *DirectoryAuditLog *UnifiedAuditLog | View (privilege insights) Adopt recommendation | Distinct <user> Count | Med | Hi |
| <Managed tenant> are experiencing abnormally high security alert volume | /api/securityIncidentAlerts | ChatGPT Advice View | Distinct <tenant> | Hi | Hi |
| Partner <user> or managed tenant <user> was added into <high-privileged role> role on <tenant> | *DirectoryAuditLog | View | — | Hi | Med |

Figure 5:
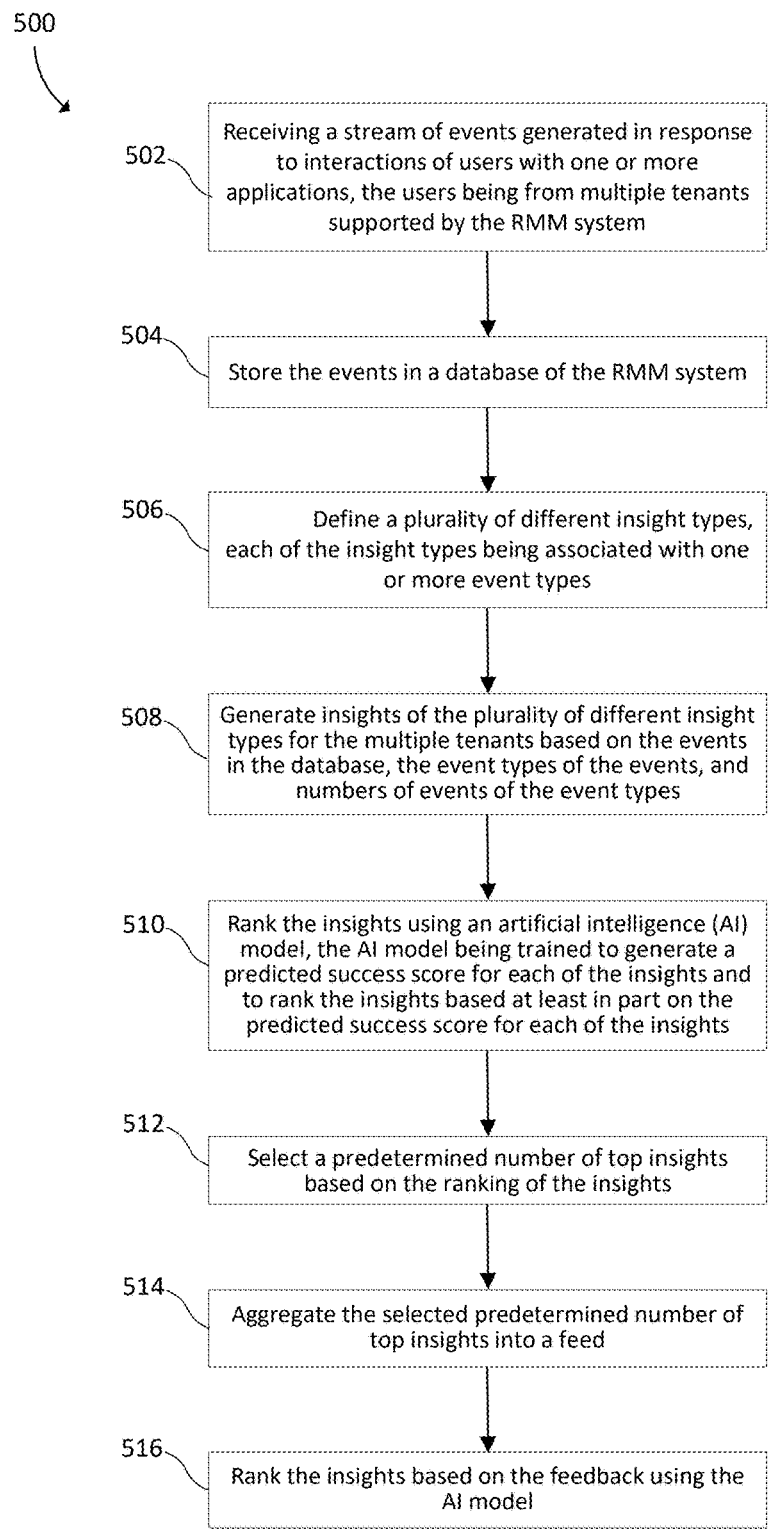
FIG. 5 shows a flowchart of an example method for utilizing the multi-tenant feed and insight platform of FIG. 3.

A flowchart of an example method 500 for utilizing a multi-tenant feed and insight platform is shown in FIG. 5. The method begins with receiving a stream of events generated in response to interactions of users with one or more applications, the users being from multiple tenants supported by the RMM system (block 502) and storing the events in a database of the RMM system (block 504). A plurality of different insight types are defined, each of the insight types being associated with one or more event types (block 506). Insights of the plurality of different insight types are generated for the multiple tenants based on the events in the database, the event types of the events, and numbers of events of the event types (block 508). The insights are ranked using an artificial intelligence (AI) model, the AI model being trained to generate a predicted success score for each of the insights and to rank the insights based at least in part on the predicted success score for each of the insights (block 510). A predetermined number of top insights are then selected based on the ranking of the insights (block 512) and aggregated into a feed (block 514). The feed is then delivered to at least one computing device associated with the RMM system (block 516).

Figure 6:
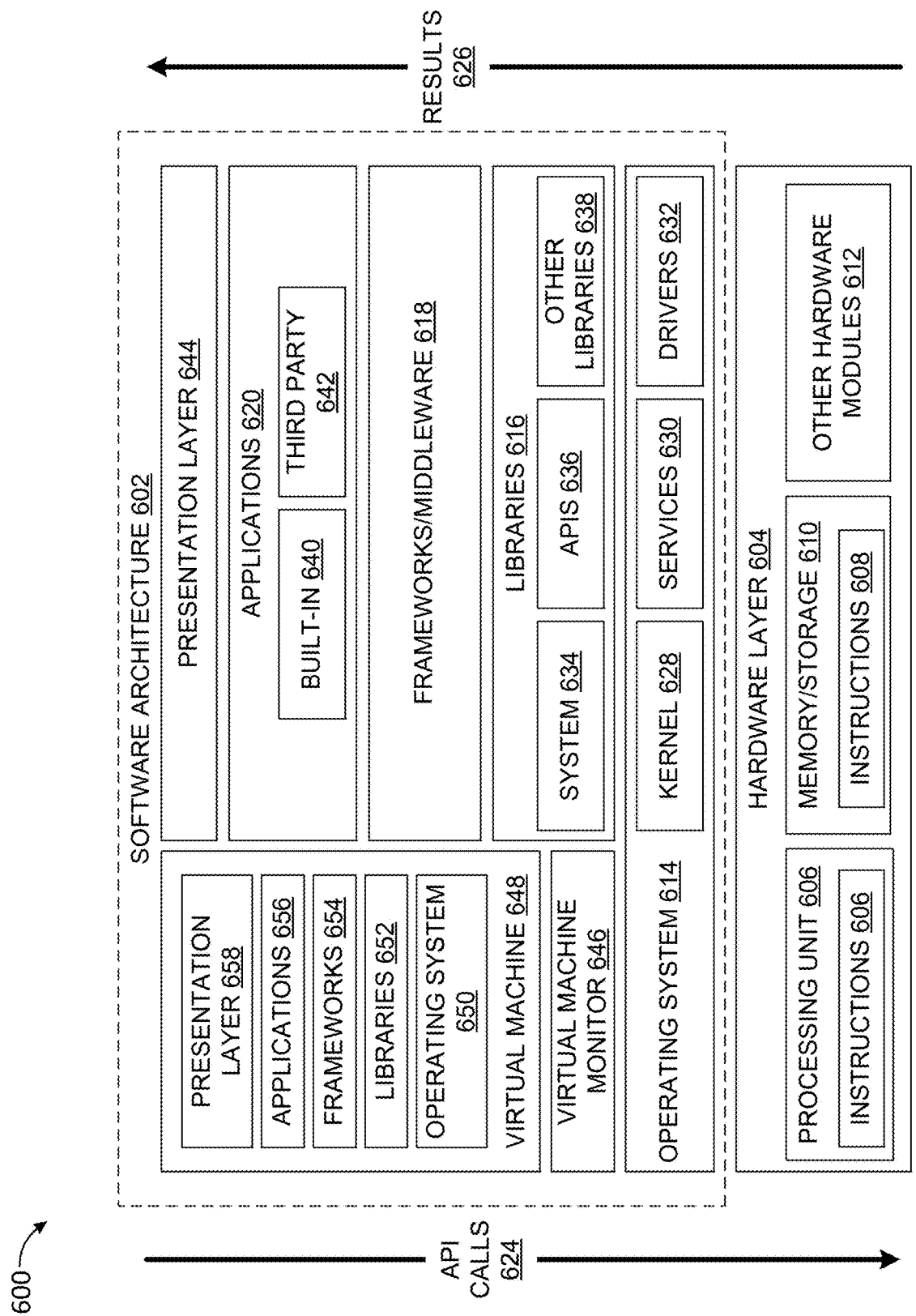
FIG. 6 is a block diagram showing an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
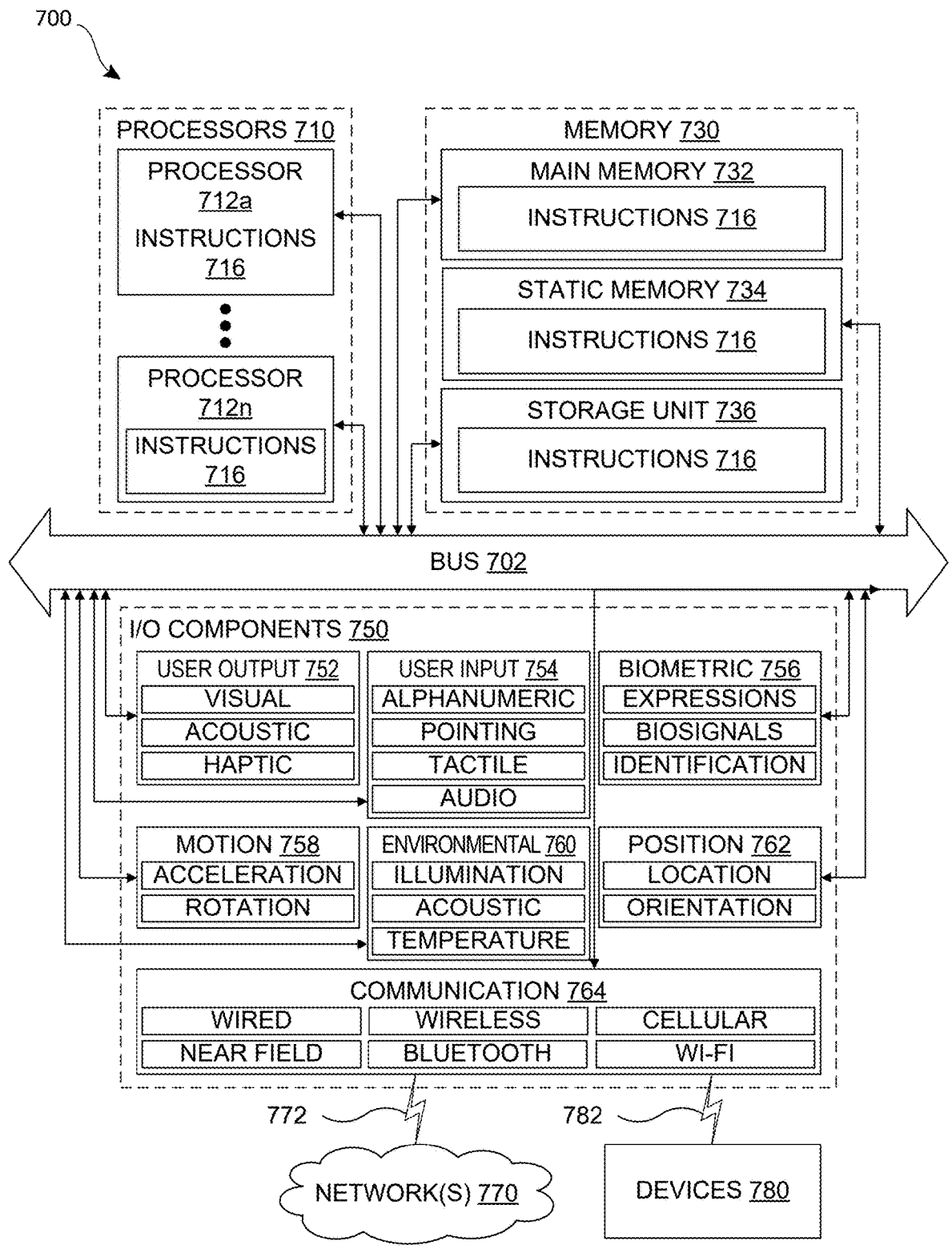
FIG. 7 is a block diagram showing components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712*a* to 712*n* that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A remote monitoring and management (RMM) system comprising:
   a processor; and
   a memory in communication with the processor, the memory comprising executable instructions that, when executed by the processor alone or in combination with other processors, cause the RMM system to perform functions of:
   receiving a stream of events generated in response to interactions of tenant users with one or more applications running on computing systems supported by the RMM system, the tenant users associated with multiple tenants supported by the RMM system, the RMM system configured to receive input related to information technology (IT)-related services for the multiple tenants;
   storing the events in a database communicatively coupled to the RMM system;
   accessing a plurality of different insight types, each of the insight types being associated with one or more event types of the events;
   generating and ranking multi-tenant insights of the plurality of different insight types using an artificial intelligence (AI) model, the multi-tenant insights being generated based on the events in the database pertaining to the multiple tenants, the event types of the events, and numbers of events of the event types, the AI model being trained to rank the multi-tenant insights based on previously collected technician-specific work data for a plurality of technicians associated with the RMM system and technician-specific feedback data for the plurality of technicians;
   aggregating a predetermined number of the multi-tenant insights into a multi-tenant insight feed based on the ranking of the multi-tenant insights;
   communicating the multi-tenant insight feed to a bot programmed to post the multi-tenant insights of the multi-tenant feed to a communication channel of a unified communication system according to a predefined schedule, the communication channel enabling communication and collaboration between users of the RMM system; and
   using the bot to post the multi-tenant insights to the communication channel according to the predefined schedule.

2. The RMM system of claim 1, wherein the functions further comprise:

for each technician of the RMM system:
generating and ranking technician-specific insights of the plurality of different insight types for the technician using the AI model, the technician-specific insights being generated based on the events in the database, the event types of the events, and the numbers of events of the event types, the AI model being trained to rank the technician-specific insights for each of the plurality of technicians based on the technician-specific work data and the technician-specific feedback data;

aggregating a predetermined number of the technician-specific insights into a technician-specific feed for the technician based on the ranking of the technician-specific insights for the technician;

communicating the technician-specific feed to an RMM client application associated with the technician; and rendering the technician-specific insights of the technician-specific feed in a user interface of the RMM client application associated with the technician.

3. The RMM system of claim 2, wherein the functions further comprise:

rendering the multi-tenant insights posted to the communication channel in the user interface of the RMM client application along with the technician-specific insights.

4. The RMM system of claim 3, wherein the functions further comprise: rendering messages posted to the communication channel in the user interface of the RMM client application.

5. The RMM system of claim 4, wherein the functions further comprise:

communicating messages generated in the user interface of the RMM client application that pertain to the multi-tenant insights to the bot; and using the bot to post the messages generated in the user interface of the RMM client application to the communication channel.

6. The RMM system of claim 5, wherein insight data and message data is communicated between the unified communication system and the RMM client application using a predefined Application Programming Interface (API).

7. The RMM system of claim 1, wherein each multi-tenant insight includes instructions that enable the unified communication system to render the multi-tenant insight.

8. The RMM system of claim 1, wherein:

each insight type is associated with an issue in the RMM system that can be addressed by the plurality of technicians, and each insight type defines at least one remediation option for addressing the issue associated with the insight type, and the at least one remediation option defined for each insight type is included with insights generated for the insight type.

9. The RMM system of claim 1, wherein:

each of the multi-tenant insights includes a text description, and the text description for each of the multi-tenant insights is generated using a Large Language Model (LLM) at run-time.

10. The RMM system of claim 9, wherein the multi-tenant insights are generated as one of a summary type and an instance type depending on the insight type associated with the multi-tenant insight, and wherein, for multi-tenant insights of the summary type, the text description includes a summarization of the events associated with the multi-tenant insights.

11. A method for implementing a remote monitoring and management (RMM) system, the method comprising:

receiving a stream of events generated in response to interactions of tenant users with one or more applications running on computing systems supported by the RMM system, the tenant users associated with multiple tenants supported by the RMM system, the RMM system configured to receive input related to information technology (IT)-related services for the multiple tenants;

storing the events in a database communicatively coupled to the RMM system;

accessing a plurality of different insight types, each of the insight types being associated with one or more event types of the events;

generating and ranking multi-tenant insights of the plurality of different insight types using an artificial intelligence (AI) model, the multi-tenant insights being generated based on the events in the database pertaining to the multiple tenants, the event types of the events, and numbers of events of the event types, the AI model being trained to rank the multi-tenant insights based on previously collected technician-specific work data for a plurality of technicians associated with the RMM system and technician-specific feedback data for the plurality of technicians;

aggregating a predetermined number of the multi-tenant insights into a multi-tenant insight feed based on the ranking of the multi-tenant insights;

communicating the multi-tenant insight feed to a bot programmed to post the multi-tenant insights of the multi-tenant feed to a communication channel of a unified communication system according to a predefined schedule, the communication channel enabling communication and collaboration between users of the RMM system; and using the bot to post the multi-tenant insights to the communication channel according to the predefined schedule.

12. The method of claim 11, further comprising:

for each technician of the RMM system:
generating and ranking technician-specific insights of the plurality of different insight types for the technician using the AI model, the technician-specific insights being generated based on the events in the database, the event types of the events, and the numbers of events of the event types, the AI model being trained to rank the technician-specific insights for each of the plurality of technicians based on the technician-specific work data and the technician-specific feedback data;

aggregating a predetermined number of the technician-specific insights into a technician-specific feed for the technician based on the ranking of the technician-specific insights for the technician;

communicating the technician-specific feed to an RMM client application associated with the technician; and rendering the technician-specific insights of the technician-specific feed in a user interface of the RMM client application associated with the technician.

13. The method of claim 12, further comprising:
rendering the multi-tenant insights posted to the communication channel in the user interface of the RMM client application along with the technician-specific insights.

14. The method of claim 13, further comprising:
rendering messages posted to the communication channel in the user interface of the RMM client application.

15. The method of claim 14, further comprising:
communicating messages generated in the user interface of the RMM client application that pertain to the multi-tenant insights to the bot; and
using the bot to post the messages generated in the user interface of the RMM client application to the communication channel.

16. The method of claim 15, wherein insight data and message data is communicated between the unified communication system and the RMM client application using a predefined Application Programming Interface (API).

17. The method of claim 11, wherein:
each insight type is associated with an issue in the RMM system that can be addressed by the plurality of technicians, and
each insight type defines at least one remediation option for addressing the issue associated with the insight type, and
the at least one remediation option defined for each insight type is included with insights generated for the insight type.

18. The method of claim 11, wherein:
each of the multi-tenant insights includes a text description;
the text description for each of the multi-tenant insights is generated using a Large Language Model (LLM) at run-time;
the multi-tenant insights are generated as one of a summary type and an instance type depending on the insight type associated with the multi-tenant insight; and
for multi-tenant insights of the summary type, the text description includes a summarization of the events associated with the multi-tenant insights.

19. A non-transitory computer readable medium on which are stored instructions that, when executed, cause a programmable device to perform functions of:
receiving a stream of events generated in response to interactions of tenant users with one or more applications running on computing systems supported by a remote monitoring and management (RMM) system, the tenant users associated with multiple tenants supported by the RMM system, the RMM system configured to receive input related to information technology (IT)-related services for the multiple tenants;
storing the events in a database communicatively coupled to the RMM system;
accessing a plurality of different insight types, each of the insight types being associated with one or more event types of the events;
generating and ranking multi-tenant insights of the plurality of different insight types using an AI model, the multi-tenant insights being generated based on the events in the database pertaining to the multiple tenants, the event types of the events, and numbers of events of the event types, the AI model being trained to rank the multi-tenant insights based on previously collected technician-specific work data for a plurality of technicians associated with the RMM system and technician-specific feedback data for the plurality of technicians;
aggregating a predetermined number of the multi-tenant insights into a multi-tenant insight feed based on the ranking of the multi-tenant insights;
communicating the multi-tenant insight feed to a bot programmed to post the multi-tenant insights of the multi-tenant feed to a communication channel of a unified communication system according to a predefined schedule, the communication channel enabling communication and collaboration between the plurality of technicians; and
using the bot to post the multi-tenant insights to the communication channel according to the predefined schedule.

20. The non-transitory computer readable medium of claim 19, further comprising:
for each technician of the RMM system:
generating and ranking technician-specific insights of the plurality of different insight types for the technician using the AI model, the technician-specific insights being generated based on the events in the database, the event types of the events, and the numbers of events of the event types, the AI model being trained to rank the technician-specific insights for each of the plurality of technicians based on the technician-specific work data and the technician-specific feedback data;
aggregating a predetermined number of the technician-specific insights into a technician-specific feed for the technician based on the ranking of the technician-specific insights for the technician;
communicating the technician-specific feed to an RMM client application associated with the technician; and
rendering the technician-specific insights of the technician-specific feed in a user interface of the RMM client application associated with the technician.

* * * * *